W. H. BENNETT & H. R. HEIGHT.
CULTIVATOR-PLOW.
No. 193,362. Patented July 24, 1877.
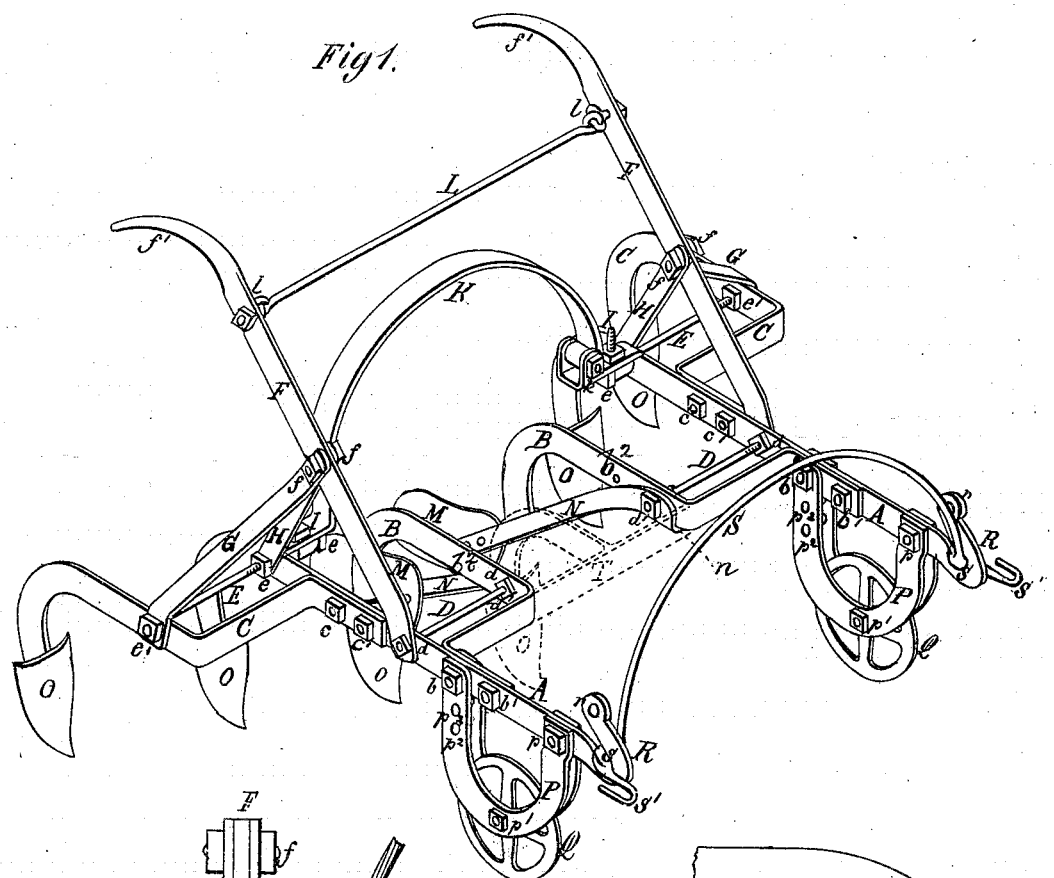
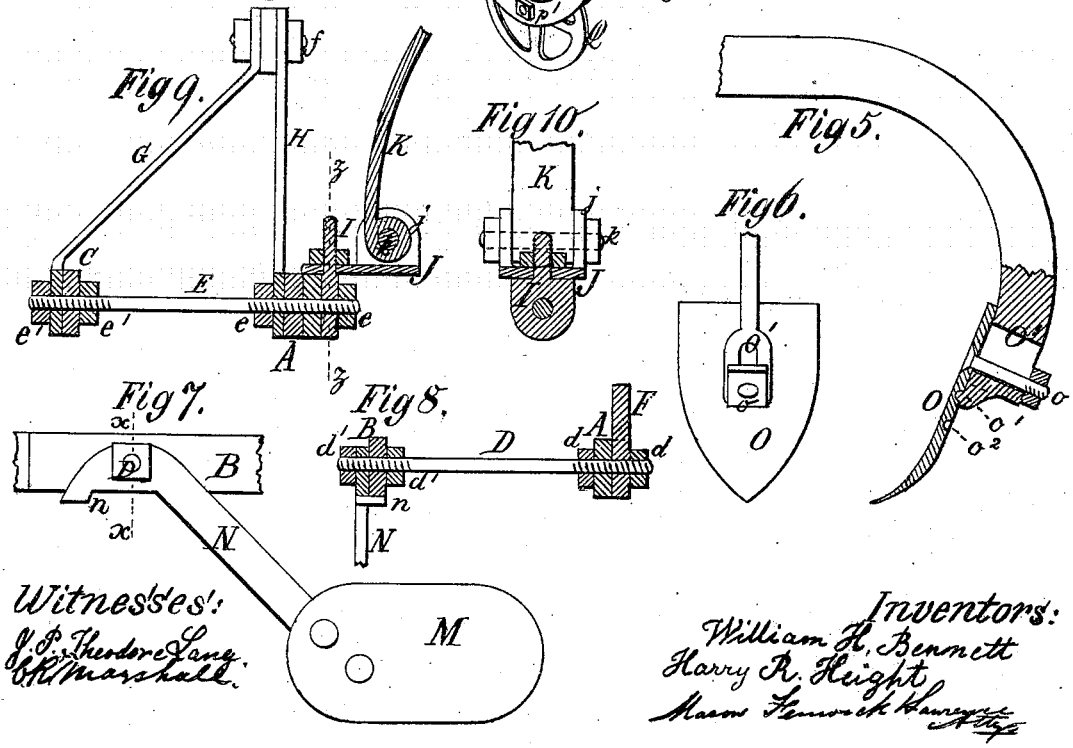
Witnesses:
Inventors:
William H. Bennett
Harry R. Height

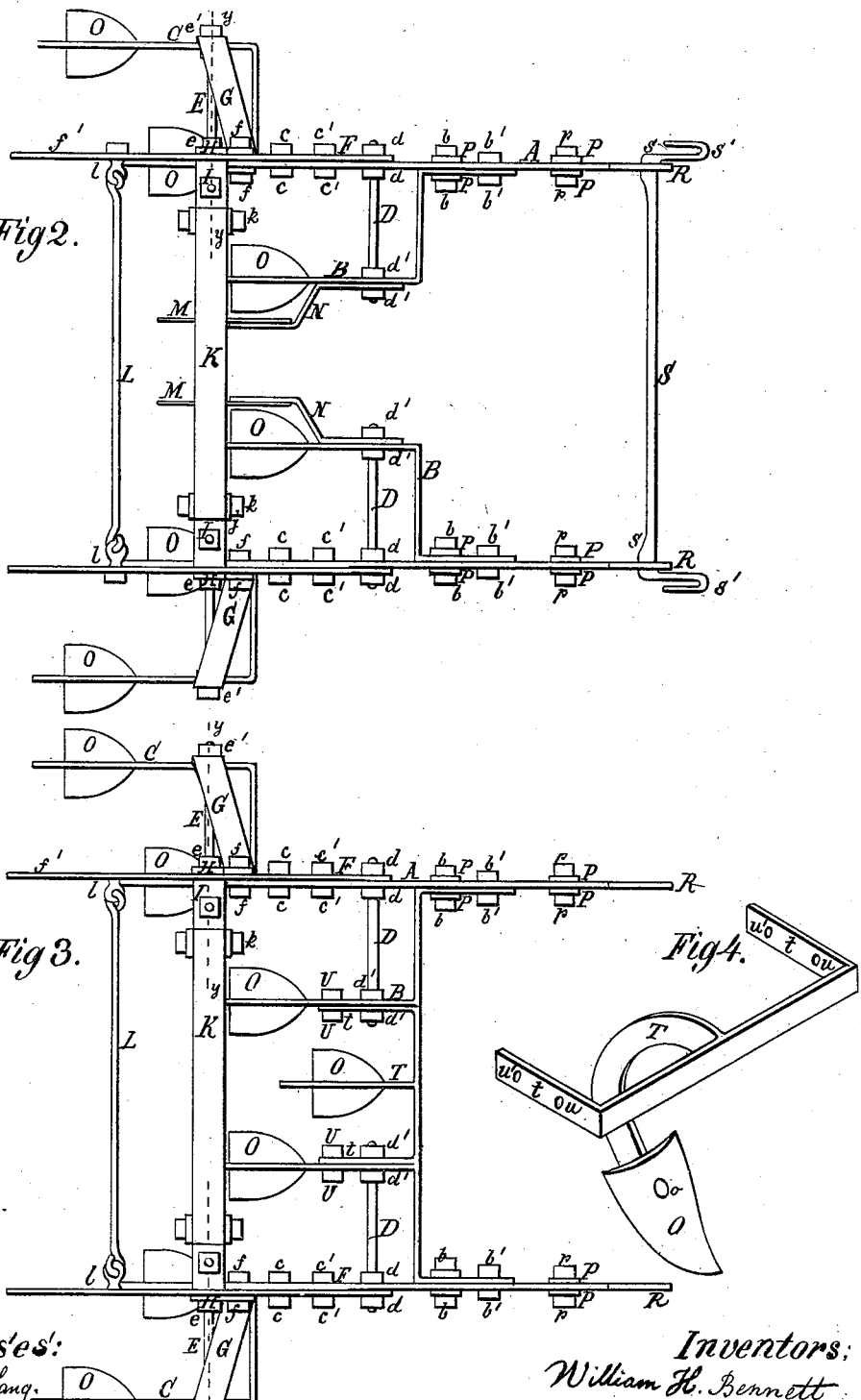

UNITED STATES PATENT OFFICE.

WILLIAM H. BENNETT AND HARRY R. HEIGHT, OF LEBANON, TENNESSEE.

IMPROVEMENT IN CULTIVATOR-PLOWS.

Specification forming part of Letters Patent No. 193,362, dated July 24, 1877; application filed May 14, 1877.

*To all whom it may concern:*

Be it known that we, W. H. BENNETT and H. R. HEIGHT, both of Lebanon, in the county of Wilson and State of Tennessee, have invented certain new and useful Improvements in Cultivator-Plows, which improvements are fully set forth in the following specification and the accompanying drawings, in which—

Figure 1 is a perspective view of one of our improved cultivators. Fig. 2 is a top view of the same, showing two inside fenders attached thereto. Fig. 3 is a similar top view, showing the fenders removed and a central plow attached thereto. Fig. 4 is a perspective view of the said central plow with its beam. Fig. 5 is a section illustrating the attachment of the plows to their beams. Fig. 6 is a back view of one of the plows fastened to its beam. Fig. 7 is a detailed view of one of our fenders, illustrating the manner of its attachment to the inner plow-beam. Fig. 8 is a vertical section through the same in the line $x \, x$ of Fig. 7. Fig. 9 is a vertical section through one of the coupling-rods and the parts connected therewith in the line $y \, y$ of Figs. 2 and 3. Fig. 10 is a vertical section through the said parts in the line $z \, z$ of Fig. 9.

Our invention relates to improvements made by us upon a cultivator patented by Joseph C. Jenkins August 3, 1875, No. 166,278, and since then wholly assigned to us; and the nature of the same consists in certain constructions, combinations, and arrangements of parts hereinafter fully described and specifically claimed.

In the drawings, A represents a center beam with a cultivator-plow attached to its rear part. Two parallel branch beams, B and C, are fastened with their angularly-bent ends to the middle beam A by means of bolts $b \, b^1$ and $c \, c'$. The said beams are braced some distance behind the above-mentioned fastenings, by stay-bolts D and E, to the middle beam A, to keep them parallel with the same. Behind the fastenings of the inner beams the lower ends of the handle-beams F are fastened to the center beam A by means of the stay-bolts D and nuts $d$. About midway of their length the said handle-beams are steadied by braces G and H, which are fastened, by means of bolts $f$, to the said handle-beams. The braces H are, by means of the bolts E and nuts $e$, fastened to the middle beams A, and the lower ends of the braces G are, by means of the bolts E and nuts $e'$, fastened to the beams C, as seen in Fig. 9. Between the center beam A and the nut $e$, and upon the bolt E, an eyebolt, I, is interposed, to which a horizontally-swinging plate J is pivoted. The said plate J has two vertical ears, $j$, and a horizontal bolt or pin, $k$, which latter supports the end of an arch, K, so as to allow it to turn upon it. The other end of the arch K is attached in a similar manner, and the middle beams A are thereby coupled so that they may be turned or tilted independently of each other, or they may also be moved one ahead of the other without injuring the said coupling. Near the handles $f'$ the handle-beams F are coupled by a rod, L, which is at each end hooked into an eye, $l$, and thereby made yielding to the twisting motions of the handle-beams F. The inner plow-beams B have each a fender, M, attached thereto by means of an arm, N, and the bolt D and nut $d'$. The front end of the arm N is provided with a lip, $n$, which bears against the lower side of the beam B, and thereby limits the downward movement of the fender M, but allows it to be lifted by obstacles in the road over which it passes, it freely swinging around the bolt D. The nuts $d'$ keep the beams N close to the beams B, and prevent both from swaying to or from the beams A. The plowshares O, Fig. 5, are attached, by means of bolts $o$, to the slotted heads O' of their respective beams, and they are steadied by means of projections $o^1$ upon the foot O', and depressions $o^2$ in the plowshares, or vice versa.

The front parts of the beams A are provided with downwardly arched or semicircular hangers P, one of which is on each side of the beam A, and they are fastened thereto by means of bolts $b$ and $p$, $b$ also serving for fastening the beams A and B together. The lowest and central parts of the hangers P are united by a bolt, $p^1$, which also serves as a pivot for a disk, Q, upon which the front part of the machine rests, and which serves also as a colter. The rear parts of the hangers P are provided with holes $p^2$ for the purpose of passing the bolts $b$ through them, where the height of the disks Q is to be adjusted, to change the dip of the plows.

The front ends of the beams A terminate in clevis-hooks R, into which the flattened parts $s$ of an arched double-tree, S, are inserted, and thus the double-tree is kept in an upright position. Outside the flat parts $s$ the said double-tree has hooks $s'$ for the attachment of teams. The flat parts $s$ are just large enough to allow the longitudinal and vertical play to which the cultivator is subject when in operation, without permitting a perceptible change of the lateral distance of the beams A, and thus the cultivator is provided with an accommodating arched brace in front as well as in its rear.

The connection of the middle beams A, formed by the swiveled arch K, and the arched double-tree S, serves to keep the said beams practically parallel with each other while in operation, and this connection of the beams A, together with the jointed rod L, serves to keep the beams in proper working condition from front to rear of the cultivator both in lateral and vertical movement. The fenders M, as usual, prevent the plowed earth from falling toward the center of the cultivator, and there covering up growing plants, and if a stone or other obstacle is in the way, the fender will mount upon and glide over it, and then by its own weight obtain its normal position again.

The arched connection K, and the arched double-tree S serve to pass over plants of considerable height, such as corn.

The disks or colter-wheel Q are made of thin metal without hubs, and kept in steady motion by means of the hangers P, which form the side bearings, and also serve to keep the said colter-wheel clean by scraping off the earth that adheres to it in leaving the ground.

When the cultivator is to be used for harrowing the fenders are removed, and the inner plow-beams B are braced by a T-shaped central plow-beam, T, with angular laps $t$ as in Figs. 3 and 4. These laps are provided with two sets of holes, $u\ u'$, the front one of which, $u$, serves to receive the end of the bolt D, and the rear one, $u'$, receives an extra bolt, U, for which purpose the beams B are provided with corresponding extra holes $b^2$. The cultivator is thus, by means of the bolts D and the T-shaped central plow-beam T, fastened and stiffened as one solid frame, and answers the purposes of a coarse harrow. In such case the arched double-tree S may be omitted, and even the connecting-rod L and the connecting-arch K may be removed, if thought proper.

It it be desired, the hooks on the ends of the arched double-tree S may be bent in opposite directions to what they are in the drawings, so as to form a link. The outside beam C may be moved forward, so as to be opposite the inner beam B, as the beam B may be moved back opposite beam C.

What we claim as new, and desire to secure by Letters Patent, is—

1. The combination of the middle plow-beam A, the outer beam C, the handle-braces G H, the eyebolts I of the swelled arch K, and the bolts E, substantially as set forth.

2. The combination of the middle beam A, the inner beam B, the fender N, the handle-beam F, and the bolt D, whereby the said parts are fastened together, substantially as set forth.

3. The combination of the middle beams A, inner beams B, handle-beams F, and bolts D passed through all of the said parts, and extended beyond the inner beam, whereby a simple fastening is secured, and either the fender N or beam T can be used at pleasure, substantially as and for the purpose described.

4. The beams A, having hooks R, in combination with the arched double-tree S, having flat bearing $s$, and outer hooks $s'$, substantially as set forth.

Witness our hand in the matter of our application for a patent for a cultivator-plow, this 5th day of May, 1877.

WILLIAM H. BENNETT.
HARRY R. HEIGHT.

Witnesses:
J. A. FUMILLO,
W. H. DOUGHERTY.